Sept. 11, 1928.                                                              1,684,309
R. F. DIRKES
METHOD OF AND MEANS FOR FEEDING TAPE AND PROJECTING DATA THEREFROM
Filed April 28, 1926     2 Sheets-Sheet 1

Inventor
R. F. Dirkes

Sept. 11, 1928.

R. F. DIRKES 1,684,309

METHOD OF AND MEANS FOR FEEDING TAPE AND PROJECTING DATA THEREFROM

Filed April 28, 1926   2 Sheets-Sheet 2

Inventor
R. F. Dirkes
By
Eugene C. Brown
Attorney

Patented Sept. 11, 1928.

1,684,309

UNITED STATES PATENT OFFICE.

ROBERT F. DIRKES, OF JAMAICA, NEW YORK, ASSIGNOR TO THE WESTERN UNION TELEGRAPH COMPANY, OF NEW YORK, N. Y., A CORPORATION OF NEW YORK.

METHOD OF AND MEANS FOR FEEDING TAPE AND PROJECTING DATA THEREFROM.

Application filed April 28, 1926. Serial No. 105,333.

This invention relates to exhibiting apparatus for projecting writing or printed matter from a movable tape upon a surface in enlarged characters, and to a method of feeding tape and projecting data therefrom and is especially adapted to be used in connection with stock quotation projectors.

In quotation projectors such as have heretofore been employed in conjunction with the well-known Western Union self-winding tickers, the transparent or semi-transparent tape or film strip issuing from the ticker or recording device passes over a glass table through which a focussed beam of light is projected. In said prior devices, the tape is moved by means of friction-driven pullers, clock spring motors or step by step magnet devices. The sudden jerk due to the instantaneous pick-up of the tape by these devices produced a corresponding jerk of the objects or characters on the screen which is very tiring on the eyes of the observers. Moreover, the tape very frequently developed a "whip" on printing which resulted in a change of focus due to the raising and lowering of the tape on the table and sometimes caused the tape to break.

One of the objects of my present improvement is to provide means for maintaining an even uniform tension upon the portion of the tape extending across the table, thereby eliminating the defects in prior devices above mentioned and also to provide means for maintaining the tape free from tension between the table and the ticker so that the latter may operate normally.

Figure 1:
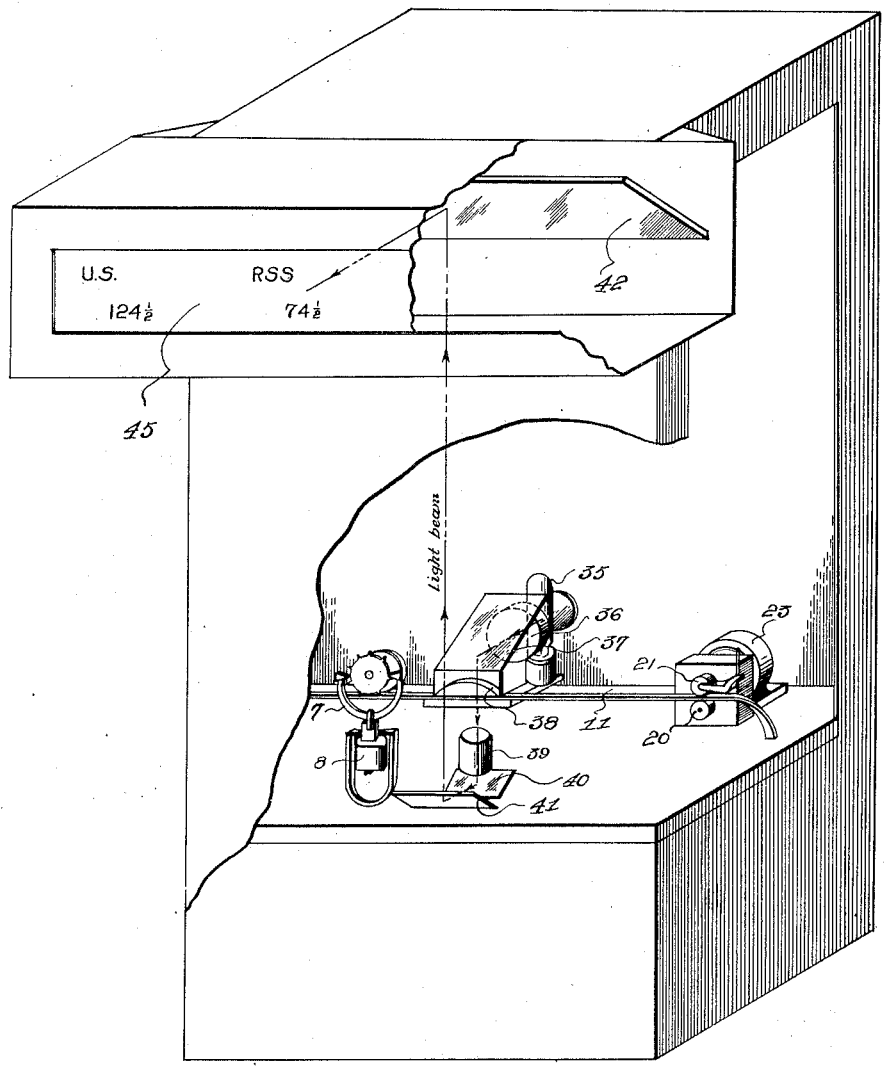
Figure 2:
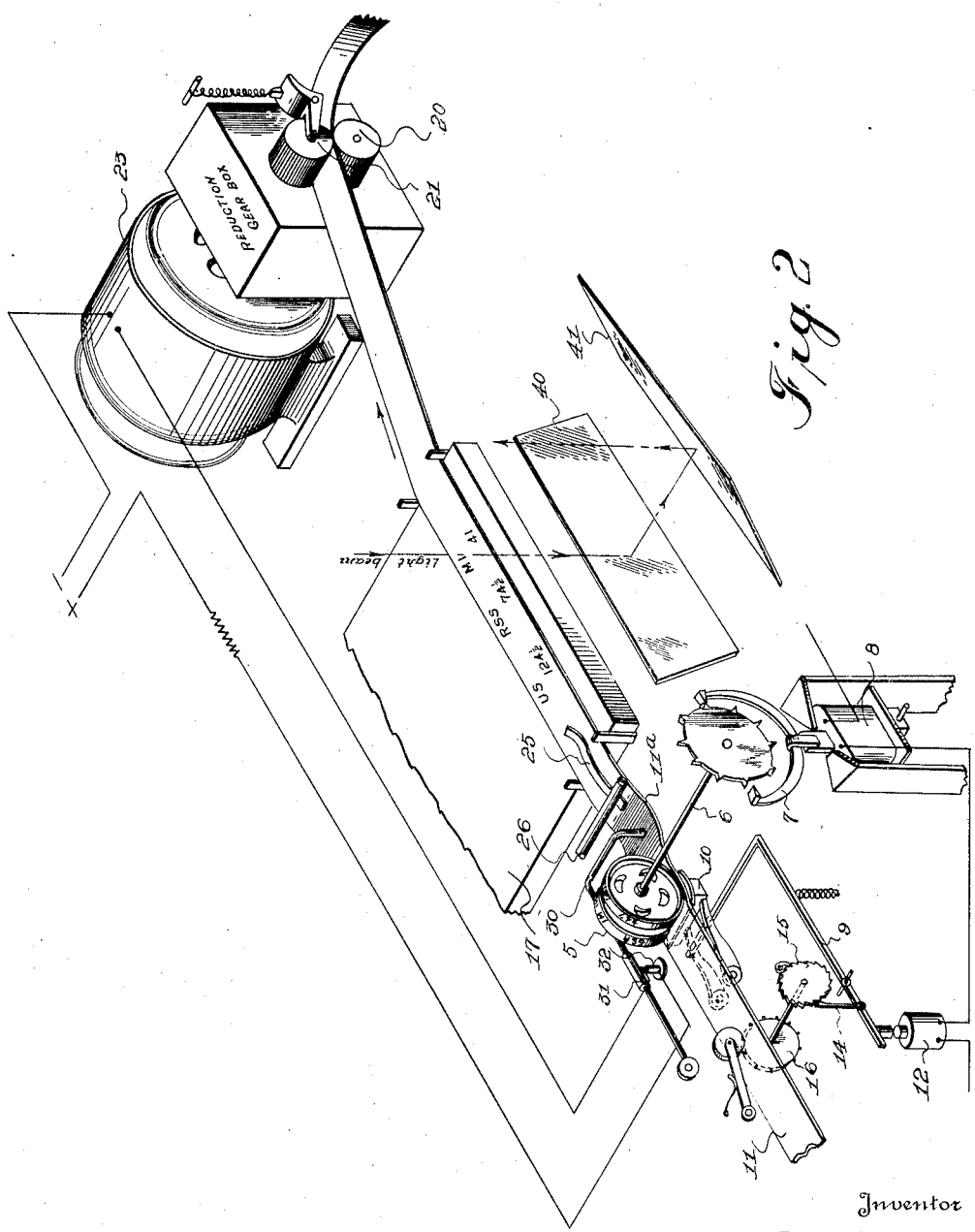

In the following detailed description, I shall refer to the accompanying drawings, in which:

Figure 1 is a perspective view of an apparatus embodying my invention, the wall of the casing or cabinet being partly broken away to expose the operating mechanism of my film feed regulator; and Figure 2 is an illustrative perspective view of the essential parts of my device.

The mechanism of the Western Union stock ticker and other well known forms of tickers, used in broker's offices throughout this country is so well known that I have merely indicated the principal elements, such as the printing wheel 5 which carries on its divided periphery the letters and figures, the shaft 6 being actuated by the usual self-winding device under control of escapement 7 which is oscillated by the magnet 8 in the ticker circuit. The lever 9 which raises the printing hammers 10 and presses the tape 11 against the type on the printing wheel or data recording device, is actuated by the press-magnet 12. On the return stroke of the lever 9 the pawl 14 moves the ratchet wheel 15 and thereby causes the feed wheel 16 to feed the tape intermittently toward the glass plate table 17.

One purpose of my invention is to maintain a certain tension on the tape or film to hold it flat against the glass table and to maintain a certain amount of slack between the table and the ticker so that the tape will move across the table without any jerks and resultant chance of breaking. To effect these results I cause the tape to be pulled across the table by passing it between gripping rollers 20 and 21, the roller 20 being positively connected through reduction gearing to the shaft of the electric driving motor 23, and the roller 21 being spring pressed. The starting and stopping of the tape are therefore uniform and without any jerking movement, the inertia of the motor armature causing it to start and stop gradually. When the motor stops the tape is firmly held by the gripping rolls so that it cannot slip backward.

The tape is frictionally held against the glass table at the side adjacent the ticker by a leaf spring 25 carried by a rod 26 secured to the frame, or in any other suitable manner and pressing centrally of the tape between the two lines of printed characters. The tape must, therefore, be pulled across the table against the pressure exerted by the spring 25, serving as a brake and hence is always maintained taut between the spring and the gripping rolls 20, 21. It is impossible, therefore, for the tape to buckle or rise from the table.

The gearing between the motor shaft and the gripping roll 20 is designed to move the tape forward at an even, uniform movement and at substantially the same rate as the tape is fed by the ticker. A certain amount of slack is maintained between the ticker and the presser spring 25 forming a loop in the tape, as indicated at 11ª, into which the tape is ejected intermittently and this will ordinarily compensate for any slight deviation from the normal speed of the ticker. In case the ticker should stop or slacken in speed, so that the slack or dip 11ª in the tape becomes less than the predetermined minimum amount, the free end of the pivoted switch control rod or arm 30 will be instantly lifted, thereby opening the switch contacts 31, 32, in the motor circuit and stopping it. The variations in the loop of the tape in the particular embodiment of the invention shown, thus control the starting and stopping of the motor. Due to the inertia or fly-wheel effect of the rotating armature of the motor, the acceleration of the tape is gradual and very uniform so that it is never subjected to sudden or undue strains and likewise the retardation of the tape is also gradual.

By restraining the direct pull of the gripping rolls upon the tape at the tension-controlling spring 25 and maintaining a predetermined minimum loop or slack at 11ª so that the tape is under no tension in the ticker, the hammers 10 can press the tape or film firmly against the type-wheel and make a clear imprint without the necessity of using a wet-inker to constantly wet the type as is the case when the tape is taut. Consequently, there is no tendency to produce a blurring of the printed characters at the type-wheel.

As indicated in Figure 1, the beam of light issuing from the lamp 35 passes through the condensing lens 36 and is reflected from the mirror 37 through the lens 38 upon the film or tape, the image of the characters passing through the glass table being projected by the lenses 39 upon the mirror 40, then reflected by the mirror 41 upwardly, striking the reflecting surface 42 from whence it is projected upon the screen 45, which may form a panel in the front wall of the cabinet or casing as illustrated in the drawing. The enlarged image of the stock quotations or other matter printed upon the tape will thus move across the screen 45 at a uniform rate, free from any blurring or distortion and without any jerking movement.

From the above it will be apparent that I have devised a novel and improved method and means for feeding a tape and also for projecting data from the tape on to a screen. The practical result of my invention is to convert an intermittent jerky motion of the tape into a motion which is so smooth and continuous that it may be projected upon a screen and be observed without causing eye strain. While I have illustrated and described my invention as employed in connection with a stock ticker tape, I do not desire to be limited thereby, as it is obvious that my invention may be practiced whenever it is desired to convert an intermittent motion of a tape into a continuous motion.

It will be obvious to those skilled in the art that various modifications in the method and mechanism described may be made without departing from the scope of my invention, and I do not intend to limit myself except as by the appended claims.

I claim:

1. The method of converting an intermittent motion of a tape into a continuous motion which consists in forming a loop in the tape where it is moving intermittently, applying a brake to the tape adjacent the end of the loop, feeding the tape from the brake with a continuous motion, and starting and stopping said continuous motion with a gradual acceleration and gradual retardation.

2. The method of converting an intermittent motion of a tape into a continuous motion which consists in forming a loop in the tape where it is moving intermittently, applying a brake to the tape adjacent the end of the loop, feeding the tape from the brake with a continuous motion, starting and stopping said continuous motion with a gradual acceleration and gradual retardation, and controlling said starting and stopping by variations in said loop.

3. The method of converting an intermittent motion of a tape into a continuous motion which consists in applying a brake to said tape, feeding the tape to the brake with an intermittent motion, feeding the tape away from the brake with a continuous motion, and starting and stopping the continuous motion with a gradual acceleration and gradual retardation.

4. The method of converting an intermittent motion of a tape into a continuous motion which consists in applying a brake to said tape, feeding the tape to the brake with an intermittent motion, feeding the tape away from the brake with a continuous motion, starting and stopping the continuous motion with a gradual acceleration and gradual retardation and controlling said starting and stopping by movement of the part of the tape having intermittent motion.

5. The method of projecting data from a tape which consists in ejecting a tape from a data recording device and with an intermittent motion, feeding said tape through the projecting position with a continuous motion, projecting upon a screen the data on said tape, and starting and stopping said continuous feed with a gradual acceleration and gradual retardation.

6. The method of projecting data from a tape which consists in ejecting a tape from a data recording device and with an intermittent motion, feeding said tape through the projecting position with a continuous motion, projecting upon a screen the data on said tape, starting and stopping said continuous feed with a gradual acceleration and gradual retardation, and controlling said starting and stopping by movement of the part of the tape having intermittent motion.

7. In combination, a recording device adapted to eject a tape therefrom with an intermittent motion, a support, means to feed said tape across said support with a continuous motion, and means starting and stopping said continuous feed with a gradual acceleration and gradual retardation.

8. In combination, a recording device adapted to eject a tape therefrom with an intermittent motion, a support, means to feed said tape across said support with a continuous motion, and means starting and stopping said continuous feed with a gradual acceleration and gradual retardation, said starting and stopping means being controlled by movement of the part of the tape having intermittent motion.

9. In combination, a recording device adapted to eject a tape therefrom with an intermittent motion, a support across which said tape is adapted to be fed, said tape having a loop therein between said recording device and said support, a tension device holding said tape against said support at the end of said loop, means for feeding the tape from said tension device with a continuous motion, and means for starting and stopping said continuous feed with a gradual acceleration and gradual retardation.

10. In combination, a recording device adapted to eject a tape therefrom with an intermittent motion, a support across which said tape is adapted to be fed, said tape having a loop therein between said recording device and said support, a tension device holding said tape against said support at the end of said loop, means for feeding the tape from said tension device with a continuous motion, means for starting and stopping said continuous feed with a gradual acceleration and gradual retardation, and means for controlling said starting and stopping by variations in said loop.

11. In combination, a recording device adapted to eject a tape therefrom with an intermittent motion, a support across which said tape is adapted to be fed, a tension device holding said tape against said support, means for feeding the tape from said tension device with a continuous motion, and means for starting and stopping said continuous feed with a gradual acceleration and gradual retardation.

12. In combination, a recording device adapted to eject a tape therefrom with an intermittent motion, a support across which said tape is adapted to be fed, a tension device holding said tape against said support, means for feeding the tape from said tension device with a continuous motion, means for starting and stopping said continuous feed with a gradual acceleration and gradual retardation, and means for controlling said starting and stopping by the part of the tape between said recording device and said tension device.

13. In combination, a recording device adapted to eject a tape therefrom with an intermittent motion, a support to receive said tape, a tension device holding the tape against the support, and means for feeding the tape from said tension device across said support, said means comprising a motor with a fly wheel effect.

14. In combination, a recording device adapted to eject a tape therefrom with an intermittent motion, a support to receive said tape, a tension device holding the tape against the support, means for feeding the tape from said tension device across said support, said means comprising a motor with a fly wheel effect, said tape forming a loop between said recording device and said tension device, and means operated by variations in said loop to start and stop said motor.

15. In combination, a recording device adapted to eject a tape therefrom with an intermittent motion, a support to receive said tape, and means to feed the tape across said support and comprising a motor having a fly wheel effect.

16. In combination, a recording device adapted to eject a tape therefrom with an intermittent motion, a support to receive said tape, means to feed the tape across said support and comprising a motor having a fly wheel effect, said tape forming a loop between said recording device and said tension device, and means operated by variations in said loop to start and stop said motor.

17. In combination, a record recording device adapted to eject a tape therefrom with an intermittent motion, a support, means to feed said ejected tape across said support with a continuous motion, and means for starting said continuous feed of the tape with a gradual acceleration.

18. In combination, a recording device adapted to eject a tape therefrom with an intermittent motion, a support across which said tape is adapted to feed, a tension device on said tape, means for feeding said tape from said tension device with a continuous motion, and means for starting said continuous feed with a gradual acceleration.

19. In combination, a recording device adapted to eject a tape therefrom with an intermittent motion, a support across which said tape is adapted to be fed, said tape having a loop therein between said recording device and said support, a tension device on said tape at the end of said loop, means for feeding the tape from said tension device with a continuous motion, means for starting said continuous feed with a gradual acceleration, and means for controlling said starting by variations in said loop.

20. The method of converting an intermittent motion of a tape into a continuous motion which consists in applying a brake to said tape, feeding the tape to the brake with an intermittent motion, feeding the tape away from the brake with a continuous motion, and starting the continuous movement of the tape with a gradual acceleration.

21. A method of projecting data from a tape which consists in ejecting a tape from a data recording device with an intermittent motion, feeding said tape through the projecting position with a continuous motion, projecting upon a screen the data on said tape, and starting said continuous feed with a gradual acceleration and controlling said starting of said continuous motion by variations in the part of the tape having an intermittent motion.

22. In combination, a data-recording device adapted to eject a tape therefrom, a projection system, means to form a loop in said tape, a lever operating on said tape whereby the tape is caused to advance when the tension of said tape is released, and a tension device adapted to exert a predetermined pressure on said tape and independent of said lever.

23. In combination, a data-recording device adapted to intermittently eject a tape therefrom, means for forming a loop in said tape, a projection system, means operated by the variations in said loop to control the feed of said tape through said projection system, and a tension device independent of the loop-operated means engaging said tape whereby the intermittent jerky movement is substantially reduced.

24. In combination, a data-recording device adapted to intermittently eject a tape therefrom, means for forming a loop in said tape, a projection system, means operated by the variations in said loop to control the feed of said tape through said projection system, and a tension device independent of the loop-operated means engaging said tape whereby the intermittent jerky movement is substantially smoothed out, said tension device being disposed between said data-recording device and said projection system.

25. In combination, a data-recording device adapted to intermittently eject a tape therefrom, a projection system, means to feed said tape through said projection system, and tension means independent of said feeding means to exert a uniform predetermined pressure on said tape whereby the intermittent jerky motion is substantially reduced.

26. In combination, a data-recording device adapted to intermittently eject a tape therefrom, a projection system, means for feeding said tape through said projection system, and means independent of the feed mechanism to prevent the transmittal of the intermittent variations to the tape in projecting position.

27. In combination, a data-recording device adapted to intermittently eject a tape therefrom, a projection system, means for feeding said tape through said projection system, and tension means independent of the feed mechanism to prevent the transmittal of the intermittent variations in the tape to the tape in projecting position.

28. In combination, a data-recording device adapted to intermittently eject a tape therefrom, a projection system, means for feeding said tape through said projection system, and means independent of the feed mechanism exerting a predetermined pressure on said tape whereby the transmittal of the intermittent variations is prevented.

29. In combination, a data-recording device adapted to intermittently eject a tape therefrom, a projection system, means for feeding said tape through said projection system, and means independent of the feed mechanism, exerting a predetermined pressure on said tape whereby the transmittal of the intermittent variations is prevented, said means being disposed between the data-recording device and the projection system.

30. In combination, a data-recording device adapted to intermittently eject a tape therefrom, a projection system, means for feeding said tape through said projection system, and means independent of the feed mechanism to prevent the transmittal of the intermittent variations in the tape, said means comprising a spring tension member.

31. In combination, a data-recording device adapted to intermittently eject a tape therefrom, a projection system, means to feed said tape through said projection system, and a tension device independent of said feeding mechanism exerting a braking action on said tape, said braking action being sufficient to prevent the tape from being pushed through the system by the same force which ejects it from the data-recording device but insufficient to prevent the tape from being pulled by the feed mechanism.

32. In combination, a data-recording device adapted to intermittently eject a tape therefrom, a projection system, means to feed said tape through said projection system, and a tension device independent of said feeding mechanism and disposed between said ticker and said projection system exerting a braking action on said tape, said braking action being sufficient to prevent the tape from being pushed through the system by the same force which ejects it from the data-recording device but insufficient to prevent the tape from being pulled by the feed mechanism.

33. In combination, a data-recording device adapted to eject a tape therefrom, means for forming a loop in said tape, a projection system, means operated by the variations in said loop to control the feed of said tape through said projection system, and a tension device independent of said control and feed mechanism to exert a braking effect on said tape.

34. In combination, a data-recording device adapted to eject a tape therefrom, means for forming a loop in said tape, a projection system, means operated by the variations in said loop to control the feed of said tape through said projection system, and a tension device independent of said control and feed mechanism to exert a braking effect on said tape, said tension device being disposed between said data-recording means and said projection system.

35. In combination, a data-recording device adapted to eject a tape therefrom, means for forming a loop in said tape, a projection system, means operated by the variations in said loop to control the feed of said tape through said projection system, and a tension device independent of said control and feed mechanism to exert a braking effect on said tape, said braking action being sufficient to prevent the tape from being pushed through the system by the same force which ejects it from the data-recording device but insufficient to prevent the tape from being pulled by the feed mechanism.

36. In combination, a data-recording device adapted to eject a tape therefrom, means for forming a loop in said tape, a projection system, means operated by the variations in said loop to control the feed of said tape through said projection system, and a tension device independent of said control and feed mechanism to exert a braking effect on said tape, said tension device being disposed between said data-recording means and said projection system, said braking action being sufficient to prevent the tape from being pushed through the system by the same force which ejects it from the data-recording device but insufficient to prevent the tape from being pulled by the feed mechanism.

37. In an apparatus for feeding a tape through a projection system, means to form a loop in said tape, a motor feed mechanism, means operated by the variations in said loop to control the operation of said motor, and means independent of said control and feeding mechanism to exert a uniform braking action on said tape adjacent the projecting position.

38. In an apparatus for feeding a tape through a projection system, means to form a loop in said tape, a motor feed mechanism, means operated by the variations in said loop to control the operation of said motor, and tension means independent of said control and feeding mechanism to exert a uniform braking action on said tape prior to projection.

39. In combination, a ticker adapted to eject a tape therefrom with an intermittent movement, a projection system, a support for maintaining the tape during projection, and means in cooperative relation with said support to substantially reduce the intermittent jerky movement of the tape.

40. In combination, a ticker adapted to eject a tape therefrom with an intermittent movement, a projection system, a support for maintaining the tape during projection, and brake means in cooperative relation with said support to substantially reduce the intermittent jerky movement of the tape.

41. In combination, a ticker adapted to eject a tape therefrom with an intermittent movement, a projection system, a support for maintaining the tape during projection, and tension means in cooperative relation with said support to substantially smooth out the intermittent jerky movement of the tape.

42. In combination, a recording device adapted to eject a tape therefrom with an intermittent jerky motion, a projector, a support adjacent said projector, and means in cooperative relation with said support to substantially smooth out the said intermittent jerky motion into a continuous motion.

43. In combination, a recording device adapted to eject a tape therefrom with an intermittent motion, a projector, a support adjacent said projector, and means holding the tape in contact with said support whereby the intermittent variations are prevented from being transmitted to the tape in projecting position on the support.

44. In combination, a recording device adapted to eject a tape therefrom with an intermittent motion, a projector, a support adjacent said projection system, and tension means holding the tape in contact with said support whereby the intermittent variations are prevented from being transmitted to the tape in projecting position on the support.

45. In combination, a data-recording device, a projection system, means for feeding a tape therethrough, said feeding means comprising a motor and a switch element carried by said tape adapted to make and break a circuit whereby said motor is started and stopped.

46. In combination, a data-recording device, a projection apparatus, and means to feed the tape therethrough, said means comprising a motor and a switch element controlled by the variations in a loop of the tape and adapted to close and open a circuit whereby the motor is started and stopped.

47. In combination, a data-recording device, a projection apparatus, means for feeding a tape therethrough, said feeding means comprising a motor and a switch element carried by said tape adapted to make and break a circuit whereby said motor is started and stopped, and means independent of said feeding means to effect a braking action on said tape.

48. In combination, a data-recording device, a projection system, means for feeding a tape therethrough, said feeding means comprising a motor and a switch element carried by said tape adapted to make and break a circuit whereby the motor is started and stopped, and means adjacent the projection system and independent of said feeding means to effect a braking action on said tape, said means comprising a spring tension member.

49. In combination, a data-recording device, a projection system, means for feeding a tape therethrough, said feeding means comprising a motor and a switch element carried by said tape adapted to make and break a circuit whereby said motor is started and stopped, and means independent of said feeding means to effect a braking action on said tape, said braking action being insufficient to prevent the feeding of the tape through the system by said feeding means.

50. In combination, a data-recording device adapted to intermittently eject a tape therefrom, a projection system, means to feed said tape through said projection system, and tension means to exert a uniform predetermined pressure on said tape whereby the intermittent jerky motion is substantially reduced.

51. In combination, a data-recording device adapted to intermittently eject a tape therefrom, a projection system, means for feeding said tape through said projection system, and means exerting a predetermined pressure on said tape whereby the transmittal of intermittent variations is prevented, said means being disposed between the data-recording device and the projection system.

52. In combination, a data-recording device adapted to intermittently eject a tape therefrom, a projection system, means for feeding said tape through said projection system, and means to prevent a transmittal of the intermittent variations in the tape, said means comprising a spring tension member.

53. In combination, a data-recording device adapted to eject a tape therefrom, means for forming a loop in said tape, a projection system, means operated by the variations in said loop to control the feed of said tape through said projection system, and a tension member to exert a braking effect on said tape, said tension device being disposed between said data-recording means and said projection system.

54. In combination, a data-recording device, a projection system, means for feeding a tape therefrom, said feeding means comprising a motor and a switch element carried by said tape adapted to make and break a circuit whereby said motor is started and stopped, and means adjacent the projection system and independent of said feeding means to effect a braking action on said tape, said means comprising a spring tension member.

55. In combination, a data-recording device adapted to eject a tape therefrom, a projection system, means to form a loop in said tape, a lever operating on said tape whereby the tape is caused to advance when the tension of said tape is released, and a tension device adapted to exert a predetermined pressure on said tape adjacent said loop.

56. In combination, a data-recording device adapted to intermittently eject a tape therefrom, a projection system, means to feed said tape through said projection system, said feeding means including a motor having a fly wheel effect, and tension means independent of said feeding means to exert a uniform predetermined pressure on said tape whereby the intermittent jerky motion is substantially reduced.

57. In combination, a data-recording device adapted to intermittently eject a tape therethrough, a projection system, means for feeding said tape through said projection system, said means including a motor having a fly wheel effect, and means independent of the feed mechanism to prevent a transmittal of the intermittent variations in the tape, said means comprising a spring tension member.

58. In a projecting apparatus wherein the image is projected from characters impressed upon a tape or film by a printing element or machine, means for imparting a smooth even movement to the tape comprising an electric motor, complementary gripping rolls, one roll being geared to the motor, a friction device for maintaining the tape taut at a uniform tension across the projecting space, means for maintaining a predetermined minimum slack in the tape between said friction device and the ticker comprising a pivotally mounted switch arm projecting into the path of the tape when the normal slack is decreased, and switch contacts in the motor circuit controlled by said switch arm, said gearing and the inertia of the motor causing the tape to start and stop gradually.

59. A projector operatively associated with a printing mechanism, comprising a transparent support for the tape, an electric motor provided with tape gripping rolls, a tension device for maintaining a drag on the tape as it is pulled across the support by the rolls, and means for maintaining a predetermined minimum of slack in the tape between the printing mechanism and the tension device including an electric switch having contacts in the motor circuit, said switch being actuated by the tape to open the circuit when the slack is decreased to said minimum.

In testimony whereof I affix my signature.

ROBERT F. DIRKES.